US008134953B2

(12) United States Patent
Mooney et al.

(10) Patent No.: US 8,134,953 B2
(45) Date of Patent: Mar. 13, 2012

(54) METHOD OF DETERMINING CHARACTERISTICS OF ACCESS CLASSES IN WIRELESS COMMUNICATION SYSTEMS

(75) Inventors: Christopher F. Mooney, Livingston, NJ (US); David A. Rossetti, Randolph, NJ (US); Jialin Zou, Randolph, NJ (US)

(73) Assignee: Alcatel Lucent, Paris (FR)

( * ) Notice: Subject to any disclaimer, the term of this patent is extended or adjusted under 35 U.S.C. 154(b) by 692 days.

(21) Appl. No.: 11/846,731

(22) Filed: Aug. 29, 2007

(65) Prior Publication Data
US 2008/0232304 A1 Sep. 25, 2008

Related U.S. Application Data

(60) Provisional application No. 60/919,488, filed on Mar. 22, 2007.

(51) Int. Cl.
*H04W 4/00* (2009.01)
(52) U.S. Cl. .... 370/328; 370/341; 370/348; 370/395.21
(58) Field of Classification Search .................. 370/328, 370/329, 395.2, 395.21, 395.42, 341, 348; 455/422.1, 512; 709/240; 713/201
See application file for complete search history.

(56) References Cited

U.S. PATENT DOCUMENTS

| 5,729,542 | A | 3/1998 | Dupont | 370/346 |
|---|---|---|---|---|
| 6,907,258 | B2 * | 6/2005 | Tsutsumi et al. | 455/512 |
| 7,194,551 | B1 * | 3/2007 | Moll et al. | 709/240 |
| 7,339,881 | B1 * | 3/2008 | Abousleman et al. | 370/203 |
| 2004/0260951 | A1 * | 12/2004 | Madour | 713/201 |
| 2005/0089045 | A1 * | 4/2005 | Shim et al. | 370/395.42 |
| 2007/0043558 | A1 * | 2/2007 | Schwarz et al. | 704/207 |
| 2008/0311899 | A1 * | 12/2008 | Moriwaki et al. | 455/422.1 |

FOREIGN PATENT DOCUMENTS

| GB | 0 994 603 A2 | 4/2000 |
|---|---|---|
| GB | 1 349 320 A2 | 10/2003 |
| GB | 1 416 683 A1 | 5/2004 |
| WO | WO 2007/016023 A2 | 2/2007 |

OTHER PUBLICATIONS

International Search Report and Written Opinion mailed Jul. 23, 2008.

* cited by examiner

*Primary Examiner* — Hassan Kizou
*Assistant Examiner* — Toan Nguyen
(74) *Attorney, Agent, or Firm* — Williams, Morgan & Amerson, P.C.

(57) ABSTRACT

The present invention provides a method of determining characteristics of access classes in a wireless communication system. In one embodiment, a method is provided for implementation in an access network of a wireless communication system. The method includes mapping, at the access network, a plurality of priority levels to a plurality of access classes. Each access class is associated with at least one parameter used by access terminals to establish a wireless communication link with the access network. The method also includes transmitting, from the access network to a first access terminal, information indicating the mapping of the plurality of priority levels to the plurality of access classes in response to receiving a request to establish a communication session between the first access terminal and the access network.

23 Claims, 2 Drawing Sheets

METHOD OF DETERMINING CHARACTERISTICS OF ACCESS CLASSES IN WIRELESS COMMUNICATION SYSTEMS

CROSS REFERENCE TO RELATED APPLICATIONS

This application claims the benefit of the filing date of U.S. Provisional Application Ser. No. 60/919,488, filed Mar. 22, 2007, entitled "Emergency and Priority Service Associated Access Classes". This application is also related to U.S. patent application Ser. No. 11/409,490, filed Apr. 21, 2006, entitled "Method of Providing Access Information to an Access Terminal" and U.S. patent application Ser. No. 11/461,671, filed Aug. 1, 2006, entitled "Accessing an Access Network to Enable Grade of Service in Calls or Flow Requests for Target Users of Access Terminals. The contents of all above-named applications are incorporated herein by reference."

BACKGROUND OF THE INVENTION

1. Field of the Invention

This invention relates generally to communication systems, and, more particularly, to wireless communication systems.

2. Description of the Related Art

A conventional wireless communication system provides wireless connectivity to numerous access terminals such as the cellular telephones, personal data assistants, smart phones, pagers, text messaging devices, global positioning devices, notebook computers, desktop computers, and the like. For example, access networks in the wireless communication system may provide wireless connectivity to access terminals located in geographical areas, or cells, associated with the access networks. To initiate a call session, an idle access terminal transmits a call request (or connection request) to one or more access networks to provide wireless connectivity to the cell that includes the access terminal. If the access network has sufficient capacity to support a new call, then the access network may transmit a message granting the access terminal's call request. The requested call session may be initiated and the access terminal may enter the active state. However, not all call requests are granted.

A call request from an access terminal may be denied because the system is overloaded and lacks sufficient capacity to support a new call. For example, the access network may not have sufficient radio frequency resources to support an air interface between the access network and the access terminal and may therefore deny the request. In other situations, there may not be sufficient backhaul capacity to support adding an additional call in the wireless communication system. In yet other situations, the processor occupancy associated with processors in the base station or access network may be too high to support an additional call. When the call request from an access terminal is denied, the access network transmits a message to the access terminal indicating that the call request has been denied. Access terminals typically respond to a call request denial using an apersistence procedure in which the access terminal waits for a random period of time (i.e., the apersistence value) before starting the access procedure again.

Access terminals typically support applications that implement Grade of Service (GoS) features and/or Quality of Service (QoS) features. For example, some applications may offer premium priority services or special family focused programs. Likewise, service providers attempt to support business sector and public sector applications such as emergency calls, priority calls (in both business and public sectors), providing police patrolling support, fire worker emergency support, a privileged level support for business leaders and commanders and enabling group communication activities. Some of the requirements associated with such applications include supporting different levels of priorities for access and admission, supporting different levels of priorities in an overload control condition, and accounting for different GoS/QoS levels in resource allocation decisions.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for determining characteristics of access classes in a wireless communication system. In one embodiment, a method is provided for implementation in an access network of the wireless communication system. The method includes mapping, at the access network, a plurality of priority levels to a plurality of access classes. Each access class is associated with at least one parameter used by access terminals to establish a wireless communication link with the access network. The method also includes transmitting, from the access network to a first access terminal, information indicating the mapping of the plurality of priority levels to the plurality of access classes in response to receiving a request to establish a communication session between the first access terminal and the access network.

In another embodiment of the present invention, a method is provided for implementation in an access terminal of a wireless communication system. The method includes receiving, from an access network and at the first access terminal, information indicating a mapping of a plurality of priority levels to a plurality of access classes in response to providing a request to establish a communication session between the first access terminal and the access network, The mapping is performed at the access network and each access class is associated with at least one parameter for potential use by the access terminal to establish a wireless communication link with the access network.

BRIEF DESCRIPTION OF THE DRAWINGS

The invention may be understood by reference to the following description taken in conjunction with the accompanying drawings, in which like reference numerals identify like elements, and in which.

Figure 1:
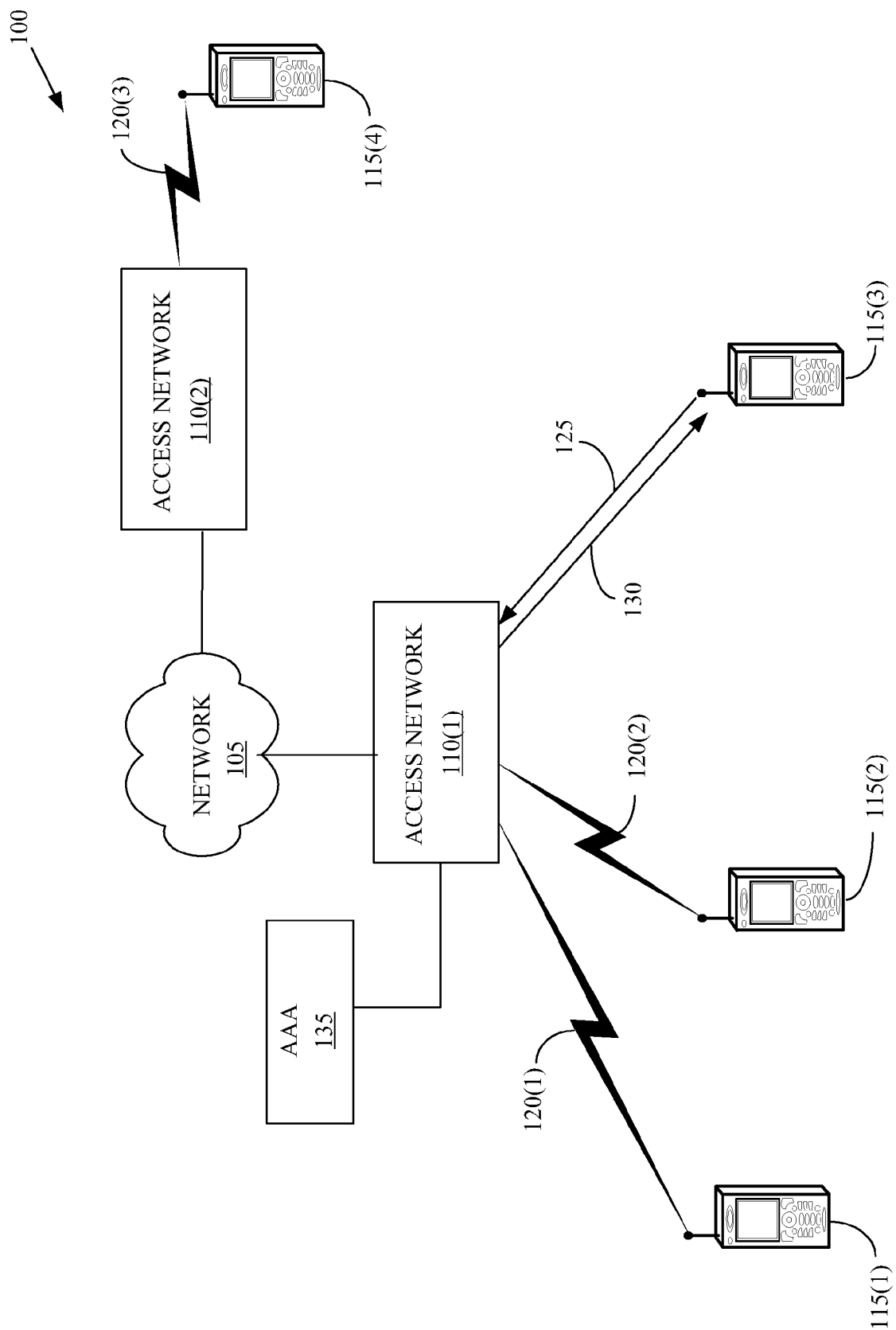
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the exemplary embodiment, the wireless communication system 100 includes a network 105. The network 105 may operate according to one or more standards or protocols such as the Universal Mobile Telecommunication System (UMTS), the Global System for Mobile communications (GSM), Code Division Multiple Access (CDMA, CDMA 2000), and the like. Persons of ordinary skill in the art having benefit of the present disclosure should also appreciate that the network 105 may include wired portions that operate according to one or more wired protocols. However, the particular standards, protocols, or combinations thereof are matters of design choice and not material to the present invention.

One or more access networks 110(1-2) may be communicatively connected to the network 105 and used to provide wireless connectivity in the wireless communication system 100. The indices (1-2) may be used to indicate individual access networks 110(1-2) or subsets thereof. However, these indices may be dropped when referring to the access networks 110 collectively. This convention may also be applied to other elements shown in the figures and indicated by a numeral and one or more indices. Although two access networks 110 are shown in FIG. 1, persons of ordinary skill in the art having benefit of the present disclosure should appreciate that any number of access networks 110 may be deployed in the wireless communication system 100. Persons of ordinary skill in the art should also appreciate that the present invention is not limited to wireless communication systems that include access networks 110. In alternative embodiments, the wireless communication system 100 may include other devices (such as radio network controllers) for providing wireless connectivity. Techniques for configuring and/or operating the access networks 110 are known in the art and in the interest of clarity only those aspects of configuring and/or operating the access network 110 that are relevant to the present invention will be discussed further herein.

Access terminals 115(1-4) are deployed within the wireless communication system 100. Four access terminals 115 are shown in FIG. 1, but persons of ordinary skill in the art having benefit of the present disclosure should appreciate that any number of access terminals 115 may be deployed in the wireless communication system 100. Persons of ordinary skill in the art should also appreciate that the access terminals 115 may also be referred to using terms such as "mobile unit," "mobile station," "user equipment," "subscriber station," "subscriber terminal," and the like. Exemplary access terminals 115 include, but are not limited to, cellular telephones, personal data assistants, smart phones, pagers, text messaging devices, global positioning devices, network interface cards, notebook computers, and desktop computers. Techniques for configuring and/or operating the access terminals 115 are known in the art and in the interest of clarity only those aspects of configuring and/or operating the access terminals 115 that are relevant to the present invention will be discussed further herein.

In the illustrated embodiment, the access terminals 115(1-2, 4) have established wireless connections to the access networks 110 over air interfaces 120(1-3), respectively. The access terminals 115(1-2, 4) are therefore referred to as being in the active state. The established wireless connections may be used to support one or more application flows over the air interfaces 120(1-3). For example, the access terminal 115(1) may have one application flow for a voice application such as Voice over Internet Protocol (VoIP) and one or more other application flows for high-speed uplink and/or downlink data flows. The wireless communication system 100 may also include an idle access terminal 115(3), e.g., an access terminal 115(3) that does not have an existing connection. Application flows may be initiated when an idle access terminal 115(3) initiates a new communication session by sending a request for access (as indicated by the arrow 125) and receiving an indication that the access network 110(1) has admitted the access terminal 115(3), as indicated by the arrow 130. Application flows may also be initiated and/or discontinued by an active access terminal 115 during an existing communication session. For example, an active access terminal 115 may provide a reservation on request (RoR) message to request resources to initiate a new application flow.

The applications implemented by the access terminals 115 may have an associated priority level. In one embodiment, applications may offer premium driven priority services or special family focused programs that may be purchased by users. For example, users may purchase Basic or Premium level services associated with applications such as VoIP, multicasting, gaming, and the like. The Basic level service may, among other things, grant the associated application a relatively low priority for accessing the wireless communication system 100. The Premium level service may, among other things, grant the associated application a relatively high priority (compared to the Basic level) for accessing the wireless communication system 100. In other embodiments, relatively high priorities may be granted to various business sector and public sector applications that support emergency calls, priority calls (in both business and public sectors), police patrolling, fire worker emergency response, communication among business leaders and military/government leaders, and the like. The priority levels associated with the applications implemented by the access terminals 115 may reflect different priority levels for access and admission, different priority levels in overload control conditions, and different resource allocation decisions for different grades of service (GoS) associated with different priorities.

In the illustrated embodiment, the wireless communication system 100 includes an Access, Authorization, and Accounting (AAA) server 135. The AAA server 135 includes systems that are implemented to securely determine the identity and/or privileges associated with each user, access terminal 115, and/or application implemented on the access terminal 115. The AAA server 135 may also be used to monitor and/or record information indicative of activities associated with the access terminal 115 and any applications supported by the access terminal 115. For example, the AAA server 135 may maintain profiles associated with each of the access terminals 115. The profiles may include, among other things, information indicating priorities associated with the access terminals 115 and/or the applications implemented on the access terminals 115. For example, the AAA server 135 may include a profile that indicates that the user of the access terminal 115(1) has purchased Basic level VoIP service and another profile that indicates that the user of the access terminal 115(2) has purchased Premium level VoIP service. Accordingly, VoIP applications on the access terminal 115(1) may operate at a relatively lower priority than VoIP applications on the access terminal 115(2). In one embodiment, the profiles may also include information indicating maximum priority levels associated with the access terminals 115 and/or the applications.

Figure 2:
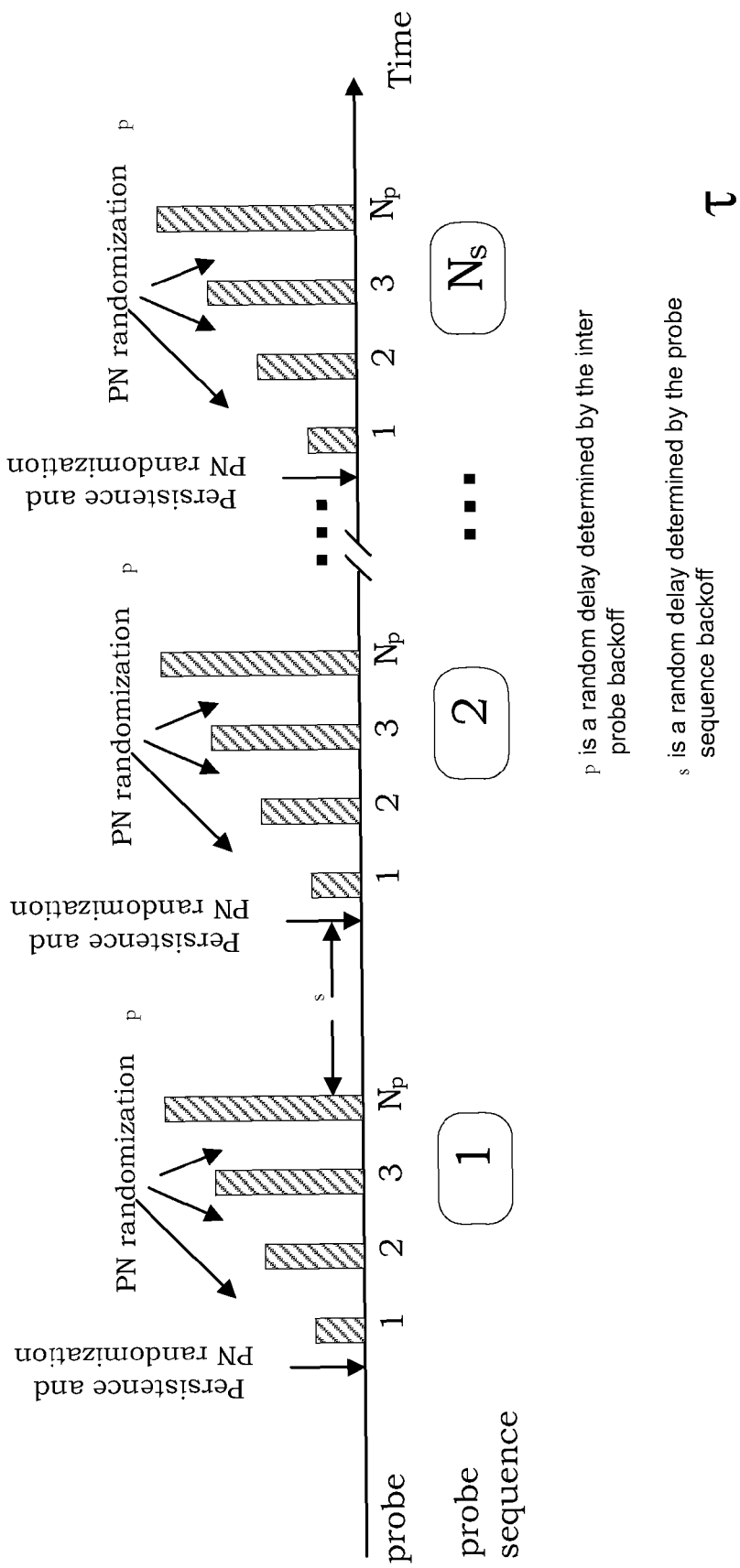
FIG. 2 shows one example of a probe sequence that is configured using an inter-probe back off parameter and a probe sequence back off.

One or more access classes may be defined for the access terminals 115 or applications implemented on the access terminals 115. Each access class is associated with information that can be used to determine how access requests associated with different applications are to be handled by the access terminals 115 and/or the access networks 110. In one embodiment, each access class indicates an apersistence value that determines a random waiting period before starting of a sequence of access probes to re-access the wireless communication system 100, a inter-probe backoff setting that determines a random delay before the next access probe will be sent after a failed access probe attempt, a probe sequence back off setting that determines a random delay after which the next group of the probe sequence will start, an access probe power level that sets the power level for access probes transmitted by the access terminals 115, one or more available carriers that may be used by the application for transmitting information, and the like. FIG. 2 shows one example of a probe sequence that is configured using an inter-probe back off parameter and a probe sequence back off.

The access networks 110 can map the priority levels associated with different applications to one or more access classes. For example, large backoff values or a smaller apersistence value could cause an access terminal 115 to take longer time to re-send the access probes and the access terminal 115 will have less chance to get access. Therefore, larger apersistence value and smaller backoff values should be applied to the access terminals 115 that have higher priorities. For another example, the access probe power could be set higher than normal for access terminals 115 with high priorities so that the high priority access terminals 115 could have better chance to get access. The parameters for one exemplary regular access class may include an Open Loop Power Adjustment Offset of 0 dB, a Probe Backoff Limit of 8 access cycles, and a Persistence of 10% (of attempts are delayed). The parameters for one exemplary high priority access class may include an Open Loop Power Adjustment Offset of +4 dB, a Probe Backoff Limit of 4 access cycles, and a Persistence of 1% (of attempts are delayed). However, persons of ordinary skill in the art having benefit of the present disclosure should appreciate that access classes are not limited to this particular set of parameter values and in alternative embodiments the access classes may include more or fewer system parameter values. Each access class may be associated with any number of priority levels. In one embodiment, the number of priority levels may be larger than the number of access classes so that one or more access classes may be associated with more than one priority level.

Once the access network 110 has mapped the priority levels to access classes, these maps (or information indicative thereof) may be transmitted to the access terminals 115 so that the access terminals 115 can select the appropriate access parameters. In one embodiment, the mapping of the priority levels to the access classes is sent to each access terminal 115 during session negotiation, e.g., in response to an idle access terminal 115(3) transmitting a request to initiate a session with the access network 110(1). Information indicating the priority levels and access class mapping table may then be delivered to the access terminal 115(3) during the initial session configuration. The format of the mapping table and the particular technique that is used to transmit the mapping table (or any form of information indicative thereof) from the access network 110 to the access terminal 115 are matters of design choice and are not material to the present invention.

In one embodiment, the access network 110 may transmit the parameter values associated with different access classes directly to the access terminals 115. For example, the access network 110 may determine values for the apersistence, the backoff, the access probe power, and/or the carriers for each of the access classes and may then transmit information indicating these values to the access terminals 115 during session negotiation. Alternatively, potential values of the various parameters associated with different access classes may be predetermined. In one embodiment, multiple access vectors are defined at the access network 110. Each access vector includes values of a group of parameters such as apersistance value, access probe parameters, access back off parameters, and available career frequencies. Access vectors could be predetermined or pre-negotiated between access networks 110 and access terminals 115 through initial session negotiation. In one embodiment, a special access vector is defined which contains the apersistance value=0, which blocks access to access terminals 115 and/or applications associated with the special access vector. The access network 110 can be configured to determine the access vectors that are applied to different access classes. In one embodiment, the number of access vectors could be larger than the number of access classes defined at the access network 110. For example, the access network 110 may be able to select the parameters associated with for access classes from a group including 16 different access vectors based on the current system loading situation and the priorities of the access classes.

The access network 110 may then transmit information indicative of the access vectors in a broadcast overhead message such as the AccessParameters message. The contents associated with the access vectors may then be stored in the access terminals 115. For example, if the access network 110 has selected four access vectors to correspond to four access classes that may be used by the access terminals 115, the access vector identifiers for the access classes can be specified in an overhead message associated with the four access classes. If the access vectors of the associated parameters are stored on the access terminals 115, the access network 110 does not need to provide those parameter values associated with the different access classes to the access terminals 115. Instead, the access network 110 can provide pointers or other identifiers associated with the access vectors that have been associated with each access class. For example, the pointers to the access vectors may be provided in overhead messages such as the AccessParameters message.

Access terminals 115 maintain the mapping table that indicates how the priority classes associated with different applications are to be mapped to access classes and the associated parameter values. When an access terminal 115 makes a call driven by a specific application having an associated priority, the access terminal 115 selects the access class corresponding to the priority level of the application using the mapping table. The access terminal 115 then configures the corresponding access parameters based on the values indicated by the access class. For example, the access terminal 115 may configure the apersistence value, backoff value, access probe power, and/or carrier based on the values indicated by the access class associated with the priority level assigned to the accessing application. The access terminal 115 may then conduct the access activity, such as transmitting a Request for Resources for the application, based on the configuration of the access parameters. For example, the access terminal 115 may follow access loading control instructions provided by the access network 110, determine the priority/QoS associated access probe power, and conduct carrier selection based on the access parameter configuration. Specific techniques for conducting access activity are known in the art and in the interest of clarity only those aspects of conducting access activity that are relevant to the present invention will be discussed herein.

In some cases, access terminals 115 may conduct access activity according to an access class associated with a priority level that is higher than the maximum priority level permitted for the access terminal 115 and/or the associated application. This may be unintentional or it may be an attempt by a user of the access terminal 115 to perform unauthorized activities. The access network 110 may therefore confirm whether the access terminal 115 is using an access class associated with a valid priority level and, if not, may force the access terminal 115 to reduce its priority level to at least a maximum permitted priority level. In one embodiment, the AAA server 135 may conduct authentication and/or authorization in response to the access network 110 receiving an access request from an access terminal 115. The AAA server 135 may then confirm the access request priority, e.g., based upon a profile associated with the access terminal 115 and/or the requesting application, or select a different priority that is less than or equal to the maximum priority level permitted for the access terminal 115 and/or the requesting application.

The confirmed and/or selected priority level may then be transmitted from the AAA server 135 to the access network 110, which may transmit information indicating the confirmed and/or selected priority level to the access terminal 115. In one embodiment, the priority level selected by the AAA server 135 may be transmitted to the access terminal 115 by adding two new negotiable Generic Attribute Update Protocol (GAUP) attributes called Max-Allowed Priority and Confirmed-Priority to the EAC MAC. The new attributes may be used to support the priority confirmation mechanism after authentication by the AAA server 135. Alternatively, the maximum allowed priority could be sent to the access terminal 115 by broadcasting this information. However, the particular technique that is used to transmit the confirmed and/or selected priority level to the access terminal 115 is a matter of design choice and not material to the present invention. Depending on whether the initial priority is confirmed or modified, the access terminal 115 may proceed with the access request at the initial priority level using the parameter values indicated by the associated access class or the access terminal 115 may modify the parameter values to correspond to the access class associated with the priority level selected by the AAA server 135.

The wireless communication system 100 supports end-to-end communications such as VoIP calls between the access terminal 115(1) and the access terminal 115(4). In some cases, the priority levels associated with the access terminal 115 that initiates an application should also be associated with any other access terminals 115 that are participating in the communication associated with the application. For example, the same priority should be associated with the access terminals 115 that terminate a high priority call that is made using a VoIP application to maintain a desired level of an end-to-end service. Examples of these applications include interactive delay-sensitive applications including Push to Talk (PoT) or media applications, applications involving group activities based on broadcast or multicast messaging and applications sensitive to power savings. The number of access terminals 115 that can share the same priority level and/or access class is therefore not limited to any particular number. For example, if the priority level and/or access class is set by an access terminal 115 that is participating in an interactive gaming application with several other access terminals 115, all of these access terminals 115 may be associated with the same priority level and/or access class.

In one embodiment, the priority level and access class associated with the initiating application (or calling party) may be assigned to the terminating application (or called party) to support end-to-end communication at the priority level associated with the initiating application or calling party. For example, a VoIP application in the access terminal 115(1) may initiate an emergency call to the access terminal 115(4). The target access terminal 115(4) should use the same high priority as the call from the originating access terminal 115(1) to conduct access activities so that the end-to-end emergency and priority services are supported when the target access terminal 115(4) responses to the page associated with the high priority call. The access network 110(2) associated with the target access terminal 115(4) should also conduct the admission control and resource allocation for the target access terminal 115(4) according to the newly granted priority level and access class of the target access terminal 115(4). For example, the target access terminal 115(4) may use the persistence value back off value, probe power, and/or available carrier assigned by the access network 110(2) to conduct the access activities.

The air interface between the target access terminal 115(4) and the access network 110(2) may support various messages that are used to establish the end-to-end emergency and/or priority services according to the priority level and/or access class of the source access terminal 115(1). In one embodiment, the call/flow priority information from the originating access terminal 115(1) is relayed to the target access terminal 115(4) via a message such as lower layer page message or upper layer signal messages. However, the form and/or type of message is a matter of design choice and not material to the present invention. In various alternative embodiments, the priority information can be delivered to the target access terminal 115(4) explicitly or implicitly. For example, the priority level or priority class of the originating access terminal 115(1) call/flow could be explicitly embedded in a message as a flag or a numerical indicator of the priority level or priority class. Alternatively, the priority information could be implicitly delivered to the target access terminal 115(4). For example, the target access terminal 115(4) may receive a message including an apersistence value and/or other parameter values which are associated with (or mapped to) certain priority levels. The target access terminal 115(4) may then use these parameter values to set the priority level so that the access terminal 115(4) operates in accordance with this priority level. In alternative embodiments, the priority information of the originating call/flow could be delivered to the target access terminal 115(4) via messages at different layers in parallel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method for implementation in an access network of a wireless communication system, the method comprising:
   mapping, at the access network, a plurality of priority levels to a plurality of access classes, each access class being associated with at least one parameter used by access terminals to access the wireless communication system via the access network; and
   transmitting, from the access network to a first access terminal, information that places said access terminal in possession of the mapping of the plurality of priority levels to the plurality of access classes in response to receiving a request to establish a communication session between the first access terminal and the access network.

2. The method of claim 1, wherein mapping the plurality of priority levels to the plurality of access classes comprises generating a table that maps the plurality of priority levels to the plurality of access classes.

3. The method of claim 2, wherein transmitting information that places said access terminal in possession of the mapping comprises transmitting the table to the access terminal so that the access terminal can use the table to select one of the plurality of access classes corresponding to a priority level used by the access terminal.

4. The method of claim 1, wherein each access class is associated with an apersistence value that determines a random waiting period before starting of a sequence of access probes to re-access the wireless communication system.

5. The method of claim 4, wherein each access class is associated with a inter-probe backoff setting that determines a random delay before a next access probe is sent after a failed access probe attempt or a probe sequence back off setting that determines a random delay after which a next group of a probe sequence starts.

6. The method of claim 1, comprising receiving, from the first access terminal, an access request associated with at least one application supported by the first access terminal, said at least one application having an associated priority, and said access request including information indicated a request to access the wireless communication system via the access network.

7. The method of claim 6, wherein receiving the access requests comprises receiving an access request performed in accordance with at least one value of said at least one parameter, said at least one value being determined based upon a priority associated with said at least one application and the information indicative of the mapping of the plurality of priorities to the plurality of access classes.

8. The method of claim 6, comprising determining whether the access request is authorized by comparing the associated priority to a selected maximum priority associated with said at least one application.

9. The method of claim 8, comprising granting the access request in response to determining that the access request is authorized.

10. The method of claim 6, wherein receiving the access request comprises receiving an access request including information indicative of a second access terminal.

11. The method of claim 10, comprises associating the access class of the first access terminal with the second access terminal and conducting access activities for the second access terminal based upon the associated access class of the first access terminal.

12. A method for implementation in an access network of a wireless communication system, the method comprising:
   mapping, at the access network, a plurality of priority levels to a plurality of access classes, each access class being associated with at least one parameter used by access terminals to access the wireless communication system via the access network;

determining said at least one parameter associated with said each access class, wherein determining said at least one parameter associated with said each access class comprises:

determining a plurality of access vectors containing a plurality of values of said at least one access parameters; and selecting at least one of the plurality of access vectors based on at least one of a current system loading and a priority associated with the access class; and transmitting, from the access network to a first access terminal, information indicating the mapping of the plurality of priority levels to the plurality of access classes in response to receiving a request to establish a communication session between the first access terminal and the access network.

13. The method of claim 12, comprising transmitting, in a broadcast overhead message, at least one access vector identifier associated with at least one of the access vectors.

14. The method of claim 13, wherein determining the access vectors comprises determining the access vectors so that each access vector includes a group of access parameters that are pre-configured to the access terminal as a look up table indexed by the vector identifier.

15. The method of claim 14, comprising mapping, at the access network, at least one access vector to said each access class and transmitting this mapping to the first access terminal.

16. A method for implementation in a first access terminal of a wireless communication system, the method comprising:

receiving, from an access network and at the first access terminal, information that places the first access terminal in possession of a mapping of a plurality of priority levels to a plurality of access classes in response to providing a request to establish a communication session between the first access terminal and the access network, the mapping being performed at the access network and each access class being associated with at least one parameter for potential use by the access terminal to access the wireless communication system via the access network.

17. The method of claim 16, wherein receiving the information indicating the mapping comprises receiving a table indicating the mapping of the plurality of priority levels to the plurality of access classes.

18. The method of claim 17, wherein receiving the information indicating the mapping comprises receiving information indicative of at least one of an apersistence value, an access probe power, a back-off value, or an available carrier associated with said each access class.

19. The method of claim 18, comprising providing an access request associated with at least one application supported by the access terminal, said at least one application having an associated priority and said access request including information indicated a request to access the wireless communication system via the access network.

20. The method of claim 19, wherein providing the access requests comprises:

determining, at the access terminal, an access class based on the associated priority and the mapping;

determining, at the access terminal, at least one value for at least one of the apersistence value, the access probe power, the back-off value, or the available carrier based on the determined access class; and providing, from the access terminal, the access request in accordance with at least one determined value.

21. The method of claim 19, comprising receiving a message granting the access request in response to the access network determining that the access request is authorized by comparing the associated priority to a selected maximum priority associated with said at least one application.

22. The method of claim 21, comprising granting a priority level to the access terminal that is the same or less than a requested priority level and not higher that the maximum priority level permitted for the access terminal.

23. The method of claim 16, wherein receiving the information indicating the mapping comprises receiving information indicating the mapping for a second access terminal in response to the second access terminal providing a call request to establish a call with the first access terminal.

* * * * *